(No Model.)

J. H. GENTRY.
HOG TRAP.

No. 383,218. Patented May 22, 1888.

WITNESSES:
Phil. C. Dieterich.
C. Sedgwick.

INVENTOR:
J. H. Gentry.
BY Munn & Co.
ATTORNEYS.

UNITED STATES PATENT OFFICE.

JOSHUA H. GENTRY, OF SHELDON, MISSOURI.

HOG-TRAP.

SPECIFICATION forming part of Letters Patent No. 383,218, dated May 22, 1888.

Application filed December 21, 1887. Serial No. 258,563. (No model.)

*To all whom it may concern:*

Be it known that I, JOSHUA HENRY GENTRY, of Sheldon, in the county of Vernon and State of Missouri, have invented a new and Improved Stock Trap and Holder, of which the following is a full, clear, and exact description.

This invention relates to a device for catching and holding a domestic animal, and has for its object to provide a device especially adapted for use with a fence or other inclosure, whereby an animal may be driven into it and secured.

The invention consists in a stock trap and holder constructed and arranged as hereinafter described and claimed.

Reference is to be had to the accompanying drawings, forming a part of this specification, in which similar figures of reference indicate corresponding parts in all the views.

Figure 1:
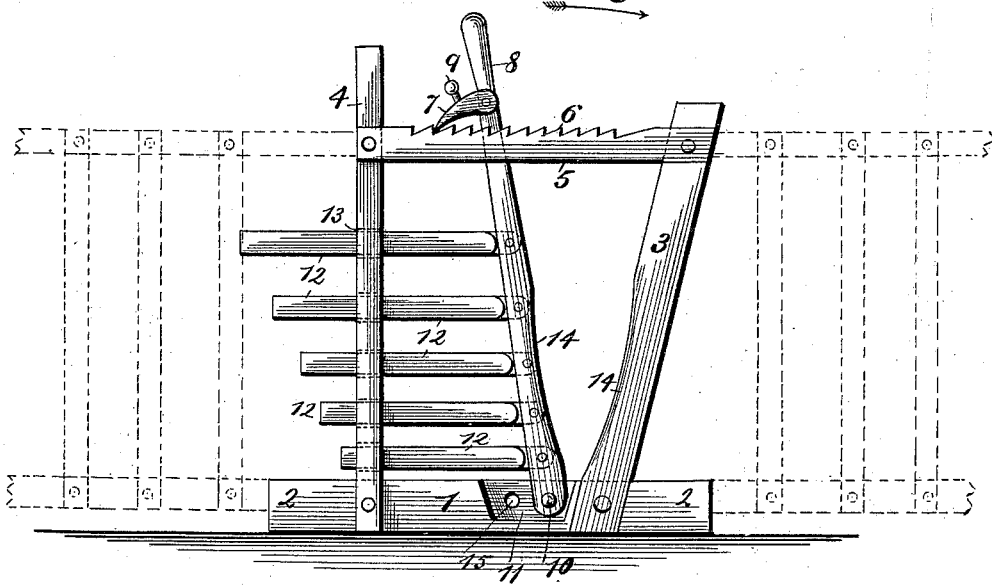
Figure 3:
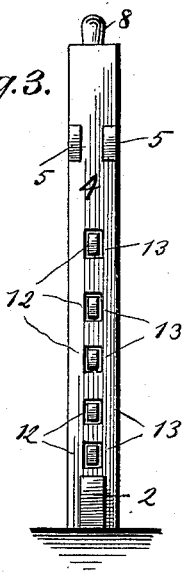
Figure 2:
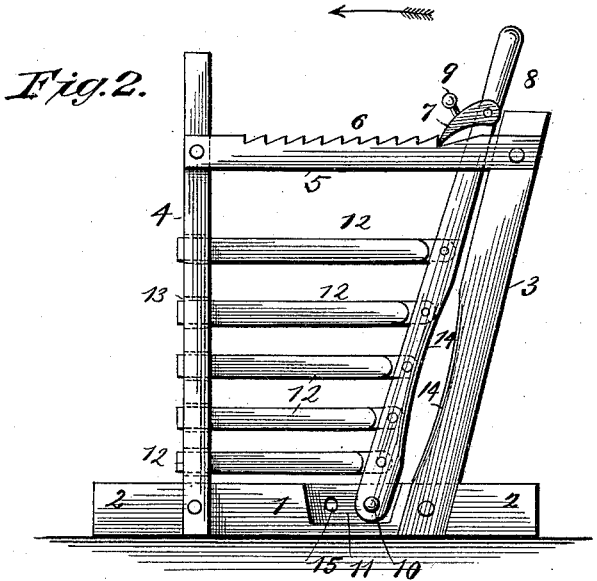
Figure 4:
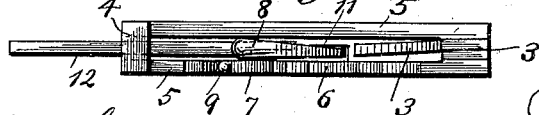

Figure 1 is a front view of the stock-trap in open position, shown in dotted lines, as applied to a fence. Fig. 2 is a front view of the stock-trap in closed position. Fig. 3 is an end or side view thereof, looking from the left in Fig. 2, and Fig. 4 is a plan view of the device as shown in Fig. 1.

In the construction of this device a base-piece, 1, is employed, having lateral extensions 2, whereby it may be secured to a fence or other inclosure, and provided with an inclined bar, 3, and a straight bar, 4, secured thereto in any suitable manner. The inclined bar 3 and straight bar 4 are connected near their upper ends by a slotted cross-bar, 5, provided with notches 6, with which a pawl, 7, pivoted on a lever, 8, is adapted to engage, the pawl 7 having a projection or handle, 9, whereby it may be lifted out of the notches 6. The lower end of the lever 8 is pivoted, by means of a removable pin, 10, in a recess, 11, in the base-piece 1, and is provided with a number of pivoted bars, 12, projecting through slots 13 in the upright bar 4, and adapted to slide therein. The incined bar 3 and the lever 8 are formed with curved portions 14, whereby the animal may be held between them by the neck.

To adapt the lever 8 and bar 3 to necks of different sizes, one or more perforations, 15, in the recess 11 may be employed, so that by withdrawing the pin 10 the lever 8 may be moved laterally and secured by inserting the pin 10 through the lever 8 and another perforation 15.

By means of the foregoing description it will be seen that a gap in a fence or other partition or inclosure may be filled by the stock-trap, and that when in open position, as shown in Fig. 1, an opening is afforded in which an animal, having inserted its head in attempting to escape from being caught, may be quickly held by pulling the lever 8 toward the bar 3 and holding the animal's neck in the space formed by the curved portions 14, the pawl 7 having been thrown into engagement with the notches 6.

This device can be cheaply made from scraps of lumber, and may be set in any gateway, gap, or stock-chute, and can be made of any size to adapt it to any-sized opening. It can also be permanently secured in a fence, if desired, and is very useful in catching and temporarily holding all kinds of domestic animals—as, for example, in milking cows, branding steers, and ringing hogs. The parts of the device are preferably made of wood; but they may be strengthened by metal, if desired. The pawl 7 is preferably made of metal.

I am aware that a lever with a pawl engaging a rack in a frame to catch and hold animals by the neck is old, as shown in Patents Nos. 325,473 and 174,205, of Arnold and Crowder, respectively; and I am also aware that a swing-gate with horizontally-sliding bars which form the horizontal bars of the gate, and which are pivotally connected to an operating-lever, whereby an opening may be formed in the gate to allow cattle to pass through, is old, as shown in patent to Strickler, No. 155,172. I make no claim to any such devices.

Having thus described my invention, I claim as new and desire to secure by Letters Patent—

A stock trap and holder consisting of the base-piece 1, having the recess 11 and perforations 15, slotted vertical bar 4, the inclined bar 3, having curved portion 14, the slotted cross-bar 5, connecting the bars 3 and 4 and having teeth 6, and the lever 8, having curved portion 14 and pawl 7, and the pivoted sliding bars 12, substantially as described.

JOSHUA H. GENTRY.

Witnesses:
C. C. CREEK,
M. A. CREEK.